(12) United States Patent
Webb et al.

(10) Patent No.: US 8,853,106 B2
(45) Date of Patent: Oct. 7, 2014

(54) PHOSPHORUS-CONTANING FLAME-RETARDANT COMPOSITIONS

(75) Inventors: Paul Webb, Leeds (GB); David Malcolm Lewis, Otley (GB); Jamie Anthony Hawkes, Leeds (GB); Andrew Edward Bayliff, Preston (GB)

(73) Assignee: Perachem Limited, Leeds (GB)

( * ) Notice: Subject to any disclaimer, the term of this patent is extended or adjusted under 35 U.S.C. 154(b) by 1415 days.

(21) Appl. No.: 12/223,075

(22) PCT Filed: Mar. 2, 2007

(86) PCT No.: PCT/GB2007/000738
§ 371 (c)(1),
(2), (4) Date: Oct. 7, 2008

(87) PCT Pub. No.: WO2007/099343
PCT Pub. Date: Sep. 7, 2007

(65) Prior Publication Data
US 2010/0233925 A1    Sep. 16, 2010

(30) Foreign Application Priority Data

Mar. 3, 2006 (GB) .................................. 0604315.2

(51) Int. Cl.
| | | |
|---|---|---|
| *D06M 15/423* | (2006.01) | |
| *D06M 11/00* | (2006.01) | |
| *C09K 21/00* | (2006.01) | |
| *B32B 27/04* | (2006.01) | |
| *D06M 11/71* | (2006.01) | |
| *C09K 21/12* | (2006.01) | |
| *D06M 11/70* | (2006.01) | |
| *D06M 13/44* | (2006.01) | |
| *D06M 13/432* | (2006.01) | |

(52) U.S. Cl.
CPC ............... *C09K 21/12* (2013.01); *D06M 11/71* (2013.01); *D06M 11/70* (2013.01); *D06M 13/44* (2013.01); *D06M 2200/30* (2013.01); *D06M 13/432* (2013.01)

USPC .......... 442/143; 252/601; 252/608; 252/610; 8/115.6; 8/127.1; 8/192

(58) Field of Classification Search
CPC .... D06M 15/423; D06M 11/00; C09K 21/00; B32B 27/04
See application file for complete search history.

(56) References Cited

U.S. PATENT DOCUMENTS

| | | | |
|---|---|---|---|
| 2,482,755 A | | 9/1949 | Ford et al. |
| 2,519,348 A | * | 8/1950 | Burnell et al. ................. 524/136 |
| 3,479,211 A | | 11/1969 | Goldstein et al. |
| 3,567,359 A | | 3/1971 | Blackbum et al. |
| 3,650,819 A | | 3/1972 | Weyker et al. |
| 3,874,912 A | | 4/1975 | Swidler et al. |
| 4,373,010 A | | 2/1983 | Oberley |
| 5,009,964 A | * | 4/1991 | Leach et al. .................. 428/526 |
| 6,270,694 B1 | | 8/2001 | Blount |
| 2006/0090267 A1 | * | 5/2006 | Sivik et al. ................... 8/115.51 |

FOREIGN PATENT DOCUMENTS

| | | |
|---|---|---|
| DE | 10045057 | * 12/2001 |
| GB | 486766 | 6/1938 |
| GB | 638434 | 6/1950 |
| GB | 1 237 155 | 6/1971 |
| JP | 54-46999 | 4/1979 |

OTHER PUBLICATIONS

Notification Concerning Transmittal of International Preliminary Report on Patentability; International Application No. PCT/GB2007/000738; International Filing Date Mar. 2, 2007 (7 pgs).

* cited by examiner

*Primary Examiner* — Jennifer Chriss
*Assistant Examiner* — Camie Thompson
(74) *Attorney, Agent, or Firm* — Nixon & Vanderhye P.C.

(57) ABSTRACT

Flame-retardant composition containing a first component selected from phosphorous acid or a salt of phosphorous acid and a second component selected from an isocyanic acid, an isocyanic acid precursor, a cyanate salt, a thiocyanate salt or isothiocyanic acid precursor, dicyandiamide, cyanamide or carbodiimide precursor.

7 Claims, No Drawings

PHOSPHORUS-CONTANING FLAME-RETARDANT COMPOSITIONS

This application is the U.S. national phase of International Application No. PCT/GB2007/000738 filed 2 Mar. 2007 which designated the U.S. and claims priority to 0604315.2 filed 3 Mar. 2006, the entire contents of each of which are hereby incorporated by reference.

COMPOSITION AND METHOD

The present invention relates to flame retardant compositions and methods relating thereto.

Many materials, such as cotton and other cellulosic materials require chemical treatment in order to render them flame retardant. This is particularly essential in the field of children's nightwear, curtains, furnishing fabrics and certain military applications.

It is desirable that flame retardant materials are low cost, durable, do not impact on the mechanical properties of the fabric, are able to tolerate traditional dyeing and printing processes for all colour ranges, meet health and safety requirements, and are environmentally acceptable.

Flame retardant (FR) compositions based on ammonium polyphosphate are known, but are not durable to washing. The present invention relates in particular to wash-durable flame retardant compositions and related methods. However, of existing wash-durable flame retardant compositions which are known, each has one or more disadvantages.

One existing wash-durable FR composition is the Proban® system of Rhodia, in which a mixture of tetrakis-hydroxymethyl-phosphonium chloride (or sulphate) and urea is applied by a padding method to a cellulosic material followed by drying in the presence of ammonia gas. Although the finish is wash-durable, it leads to discolouration of simple azo dyes and is therefore only suitable for vat dyed fabrics. In addition the use of ammonia gas leads to additional safety considerations, engineering challenges and associated cost implications.

Another existing wash-durable FR composition is the Pyrovatex® system of Huntsman which is based on dialkylphosphonocarboxylic acid-amide chemistry. However, this system is comparatively expensive and leads to residual levels of free formaldehyde which renders it undesirable for clothing and children's wear in particular. Formaldehyde is a known carcinogen and levels must be controlled in workplaces where it can be generated.

U.S. Pat. No. 6,270,694 (Blount) describes flame retardant compositions which are prepared by first reacting urea with an organic compound which will condense or react with the urea, and then adding a phosphorous and/or boron containing compound which will react with the previously formed urea condensate. The wash durability of these compositions is not discussed.

It is an object of the present invention to provide a wash-durable FR composition which overcomes at least one disadvantage of the prior art.

By wash-durable FR finish, it should be understood that the treated material remains flame retardant following normal laundering of the material. Normal laundering will to some extent depend on the function of the material. However in preferred embodiments the material will remain flame retardant following at least 2 washes in a typical household washing machine at 40° C. using non-biological washing powder. Preferably the material will remain flame retardant after at least 5 washes, more preferably at least 12 washes and most preferably at least 50 washes. As an alternative to using household washing machines to test wash persistence, preferred embodiments may remain flame retardant following a 20 minute boil in aqueous alkali non-ionic surfactant.

By flame retardant it is meant that the material does not burn when a flame is applied. Suitably the material will char rather than burn in the region where a flame is applied and any glowing of the fabric in the region of impingement of the flame will not persist after the removal of the flame. For example, the material does not burn when a butane flame is applied perpendicular to the material for 15 seconds. Precise test conditions for different market end uses are well known to those skilled in the art.

According to a first aspect of the present invention, there is provided a flame-retardant composition comprising a first component selected from a phosphorus-containing acid or a salt of a phosphorus-containing acid and a second component selected from an isocyanic acid, an isocyanic acid precursor, a cyanate salt, a thiocyanate salt or isothiocyanic acid precursor, dicyandiamide, cyanamide or carbodiimide precursor.

The first component is preferably selected from the group consisting of phosphoric acid, pyrophosphoric acid, triphosphoric acid, metaphosphoric acid, hydrophosphorous-containing acid, phosphinic acid, phosphinous acid, phosphorous acid; and salts thereof. Preferred salts are those of volatile nitrogen containing bases such as ammonia or amines such as ethanolamine or diethanolamine. Most preferably the first component comprises phosphorous acid ($H_3PO_3$) or a salt thereof.

Where the first component comprises a salt of a phosphorus-containing acid, the salt may be added directly as a salt to form the composition. Alternatively the salt may be generated in situ by adding the acid and a suitable base. For example, the composition may comprise a phosphorus-containing acid and ammonium hydroxide.

The first component may comprise a mixture of two or more phosphorous-containing acids or salts thereof.

Preferably the first component is present in the composition in an amount of at least 1 wt %, more preferably at least 5 wt % and most preferably at least 10 wt %. Preferably the composition of the present invention contains up to 60 wt % of the first component, preferably up to 50 wt % and more preferably up to 40 wt %.

Preferably the second component of the composition of the present invention comprises a metal cyanate salt, preferably a metal cyanate salt selected from the group consisting of sodium cyanate, potassium cyanate, lithium cyanate, calcium cyanate and magnesium cyanate. Most preferably the second composition comprises a metal cyanate of a group I metal. Most preferably the second composition comprises potassium cyanate. Alternatively and/or additionally, the second component may comprise an organic ammonium cyanate, ammonium cyanate, ammonium carbamate, and/or isocyanic acid, isothiocyanic acid, dicyandiamide, cyanamide or carbodiimide precursor.

Preferably the composition comprises the second component in an amount of at least 1 wt %, preferably at least 5 wt %, more preferably at least 10 wt % and most preferably at least 20 wt %. Preferably the composition comprises the second component in an amount of up to 70 wt %, more preferably up to 60 wt %, preferably up to 50 wt %, and most preferably up to 40 wt %.

In a preferred embodiment the composition comprises a base, preferably concentrated ammonia solution (ammonium hydroxide) in addition to a phosphorus-containing acid. Other suitable bases include metal hydroxides, for example potassium hydroxide; and organic amines. When present the ammonium hydroxide solution is preferably present in an amount of at least 1 wt %, more preferably at least 5 wt %, preferably at least 10 wt % and most preferably at least 15 wt %. Preferably the ammonium hydroxide composition is present in an amount of up to 50 wt %, preferably up to 40 wt %, more preferably up to 30 wt %, and most preferably up to 25 wt %.

Preferably the composition is an aqueous composition. Preferably it comprises at least 1 wt % water, more preferably at lest 5 wt %, preferably at least 10 wt %, more preferably at least 20 wt % and most preferably at least 30 wt % water. Preferably the composition comprises up to 90 wt % water, more preferably up to 60 wt % and most preferably up to 50 wt %. Typically the composition comprises from 35 to 45 wt % water.

In some embodiments the composition may comprise a further nucleophilic component. This may, for example be selected from an amine or an alcohol. Preferably the nucleophilic component is an alcohol, more preferably it is a polyhydric-alcohol, for example a diol or triol. Most preferably the nucleophilic component is ethylene glycol. Other suitable nucleophilic compounds include organic compounds containing alcohol, thiol, amine or sulfite functionality, or combinations thereof; and inorganic sulfites.

The nucleophilic component is preferably present in an amount of up to 10 wt %, more preferably up to 5 wt % and most preferably up to 2 wt %. Suitably the nucleophilic component is present in an amount of at least 0.1 wt %, preferably at least 0.5 wt % and most preferably at least 1 wt %.

Optionally the composition may comprise additives known to those skilled in the art of textile coating. For example, the composition may include wetting agents. Such compounds are known to aid the penetration of fabric fibres during treatment. A suitable wetting agent is Listril NGS, available from Stephenson Group, Bradford, UK.

Preferably the composition of the present invention is alkaline. Preferably it has a pH of at least 7.5, more preferably at least 8.5. Preferably the composition has a pH of less than 13.5, more preferably less than 12.5 and most preferably less than 10.5. Suitably the pH of the composition of the present invention is about 9 to 9.5.

The above definitions apply to the pH of a flame retardant composition in accordance with the invention which is suitable for application to a material. It will be appreciated however that the pH of such a composition may vary during its manufacture and following its application to a material.

In one embodiment the present invention provides a flame-retardant composition comprising: from 5 to 20, preferably 8 to 15 wt % phosphorous acid;

from 1 to 40, preferably 20 to 30 wt % potassium cyanate;

from 10 to 30, preferably 15 to 25 wt % ammonium hydroxide;

from 0.1 to 5, preferably 1 to 2 wt % ethylene glycol; and water.

According to a second aspect of the present invention, there is provided a method of treating a material, the method comprising:
(a) applying to the material a composition comprising a first component selected from phosphorous-containing acid or phosphorous-containing acid salt; and
(b) applying to the material a composition comprising a second component selected from an isocyanic acid, an isocyanic acid precursor, a cyanate salt, a thiocyanate salt or isothiocyanic acid precursor, dicyandiamide, cyanamide or carbodiimide precursor.

The material treated by the method of the second aspect is suitably provided with a wash-durable flame retardant finish.

In preferred embodiments of the second aspect of the present invention, the composition applied in step (a) is the same as the composition applied in step (b) and the two steps are carried out simultaneously. Thus steps (a) and (b) may be combined to produce a single treatment for the material. In such embodiments therefore, the method of the second aspect comprises treating the material with a composition of the first aspect. However, in alternative embodiments, steps (a) and (b) may be carried out sequentially and may be carried out in either order. Thus, in some embodiments, step (a) comprises applying a first composition to the material and step (b) comprises applying a second separate composition to the material.

Preferably the material is a textile material. Suitable textile materials include synthetic and natural materials, such as nylon, cotton, wool, hemp, flax, jute, leather and the like for example.

Preferably the material to be treated is a cellulosic material. Suitable non-textile cellulosic materials include non-woven materials, wood, reconstituted wood products (e.g. MDF), paper and cellulosic pulps used for the manufacture of wood or paper based products.

Preferably the method further comprises a step (c) of curing the material.

There may be an optional step between steps (a) and (b) (or steps (b) and (a) when interchanged) of drying the material, when steps (a) and (b) are sequential. When steps (a) and (b) are combined, as is preferred, there may be a drying step after steps (a) and (b) and before step (c).

The optional drying step between steps (a) and (b) (or (b) and (a) when interchanged) or after combined steps (a) and (b) as is preferred, suitably comprises drying the material in an oven at a temperature of at least 80° C., more preferably at least 90° C., and most preferably at least 95° C.

Said optional drying step is preferably carried out for a period of at least 5 seconds, more preferably at least 10 seconds, more preferably at least 20 seconds, most preferably at least 25 seconds. The drying may suitably be carried out for a period of about 20 to 60 seconds, for example about 30 seconds.

It is however, possible—when steps (a) and (b) are carried out sequentially—to coat the materials 'wet on wet' thereby eliminating optional drying step.

The curing step (c) may be achieved by a number of alternative methods. In one method, the treated cloth may be batched at an appropriate temperature. Batching is a procedure well known to those skilled in the art. Batching comprises rolling up the freshly treated fabric into a cylinder which is protected by an impermeable layer of material such as polythene. The roll is then stored at the appropriate temperature until the reaction is complete. The temperature may be below or above or at ambient temperature. In another embodiment, the treated cloth is baked in an oven. This is preferably carried at a temperature of at least 100° C., preferably at least 110° C., most preferably at least 120° C. Curing step (c) may be carried out at a temperature up to 220° C., preferably up to 210° C., preferably up to 200° C. Suitably curing is carried out at a temperature of 180° to 200° C.

For baking in an oven, curing step (c) is preferably carried out for at least 10 seconds, more preferably at least 20 seconds, more preferably at least 30 seconds. Curing step (c) may be carried out for up to 10 minutes, preferably up to 8 minutes, preferably up to 7 minutes, most preferably up to 6 minutes. Curing step (c) may suitably be carried out at a temperature of approximately 200° C. for approximately 30 seconds.

In curing step (c), batching and oven baking may be combined to make a two stage curing process. Alternatively, in some embodiments, after batching the cloth can be simply dried in an oven to remove remaining volatile components such as water.

In some preferred embodiments, in the method of the second aspect the composition(s) applied to the material may include a catalyst. The catalyst may suitably reduce the curing time and/or temperature. This is desirable as long curing times/temperatures can lead to a discolouration of the material. Any suitable catalyst may be used. Preferred catalysts are tertiary amines. An especially preferred catalyst is DABCO. Other suitable catalysts include Lewis acids, particularly magnesium chloride, zinc chloride or complexes of these metals. Organometallic catalysts may also be suitable, for example dibutyl tin dilaurate. The catalyst options will generally be known to those skilled in the art and can be employed in combination for additional effect.

The composition(s) may also be adapted to maintain a suitable pH during the method. This can be achieved in a number of ways known to those skilled in the art. For example, choice of the acid salt can lead to different pH profiles during the method. Use of a separate pH buffer system is a possible option which enables the pH to be maintained in a relatively narrow band. The selection of a suitable pH is important for the best reaction profile but must be appropriate to the sensitivities of the fabric substrate. For example, cotton should preferably be maintained above pH3 to avoid fibre damage.

Preferably the method of the second aspect of the present invention comprises applying a composition of the first aspect to a material, thus combining steps (a) and (b).

Preferably the composition applied has a pH of between 7 and 13, preferably between 8 and 11, more preferably between 9 and 10.

An advantage of the present invention is that because the applied composition is alkaline, the treated materials maintain their strength. Treatment with strongly acidic materials tender the fabric and may lead to strength loss of up to 50%.

Preferably during curing step (c), the pH of the applied composition falls. Suitably after step (c), the material coated with composition has a pH of from 5 to 8, preferably from 6 to 7, for example about 6.5. The fall in pH during the curing step (c) may, for example be due to the release of a volatile alkali material during the thermal decomposition of the applied composition(s).

When the applied composition comprises phosphorous acid, potassium cyanate and ammonium hydroxide, compounds released which may be responsible for the fall in pH include ammonia gas.

Alternatively, a compound which produces an acidic material upon thermal decomposition may be added to the composition(s) applied to the material. One such compound is triethanolamine triacetate which decomposes to release acetic acid.

The composition(s) may be applied using any suitable method. In a preferred application method, a solution of the or each composition is padded onto material, for example at a wet pick up of 60 to 70%, although the equipment configuration may dictate other suitable wet pick up settings.

The application of the composition(s) to the material is preferably such that the percentage of phosphorous deposited on the material is at least 0.5% by mass of the material, more preferably at least 1%. Preferably the application is such that phosphorous is deposited on the material in an amount of up to 15% by mass of the material, more preferably up to 12%, preferably up to 10%, most preferably up to 8%. In especially preferred embodiments the application method is such that the mass of phosphorous deposited is 2 to 5% compared to the mass of the material. These percentages refer to the amount of elemental phosphorous which is deposited on the material, not to the mass of phosphorous-containing acid or phosphorous containing acid salt applied.

For embodiments in which steps (a) and (b) are carried out sequentially, the concentration of the solution of phosphorous-containing acid is preferably from 50 to 500 $gdm^{-3}$, preferably 100 to 200 $gdm^{-3}$, more preferably 150 to 170 $gdm^{-3}$, and most preferably 150 to 200 $gdm^{-3}$.

In such sequential embodiments, step (b) preferably comprises padding onto the material a solution of cyanate or isocyanate salt. For sodium cyanate this preferably comprises padding a solution comprising at least 0.5 mol $dm^{-3}$ sodium cyanate, preferably at least 1 mol $dm^{-3}$ sodium cyanate, more preferably at least 2 mol $dm^{-3}$, and most preferably at least 3 mol $dm^{-3}$ sodium cyanate. A suitable concentration of sodium cyanate may be 4 mol $dm^{-3}$.

Optionally the method of the present invention may further comprise a step (d) of repeating steps (a) to (c) and any optional steps such that the material is subject to two consecutive treatments.

The method of the second aspect may comprise optional further treatment steps after curing.

For example, following curing the material may be rinsed with cold water. It may then be optionally treated with an acid, for example formic acid. It may optionally be treated with a quaternary ammonium salt, for example choline, tetramethyl ammonium bromide, cetyl trimethyl ammonium bromide, epichlorohydrin, and derivatives of polyamines, for example Isol Fixer NFO, available from Ionic Solutions, Bradford, UK.

According to a third aspect of the present invention, there is provided a method of making a composition of the first aspect, the method comprising the steps of:
a) dissolving a phosphorous-containing acid or salt thereof in water;
b) forming an aqueous solution of an isocyanic acid, an isocyanic acid precursor, a cyanate salt, a thiocyanate salt or isothiocyanic acid precursor, dicyandiamide, cyanamide or carbodiimide precursor; and c) mixing together the components formed in steps a) and b).

Steps a) and b) may be carried out in either order. In some preferred embodiments they are carried out sequentially. In other preferred embodiments mixing step c) is performed slowly by adding one of components a) or b) to the other. In some embodiments, in which step a) comprises the step of dissolving a phosphorous-containing acid in water, there may be an additional step between steps a) and b) of adding a base to the solution of phosphorous-containing acid formed in step a) to form a salt of a phosphorous-containing acid or partial salt thereof in situ. In preferred embodiments, step a) comprises dissolving phosphorous acid in water. In especially preferred embodiments, step a) is followed by the addition of ammonium hydroxide to the solution of phosphorous acid is formed in step a).

In a preferred embodiment, step b) comprises forming a solution of potassium cyanate and step c) comprises adding said solution of potassium cyanate to a solution of phosphorous acid and ammonium hydroxide.

In preferred embodiments, the method of the third aspect comprises a third step d) following step c) of leaving the mixed solution for a period of time before use. Preferably, the mixed solution is left at a temperature of from −20 to 60° C., more preferably from 0 to 40° C. Preferably the solution is left at ambient temperature, for example 15 to 25° C.

Preferably, in step d) the solution is left for at least 1 hour, more preferably at least 4 hours, preferably up to at least 8 hours, more preferably at least 12 hours, and most preferably at least 16 hours. The composition may be left before use for up to one year for example up to 6 months, up to 1 month, or up to 15 days.

In some embodiments, the method of the third aspect may further comprise a step e) of adjusting the pH of the composition after step d). This may be done by any conventional means, for example by adding an acid or base. Typically formic acid may be added.

The applicant has found that phosphorous acid ($H_3PO_3$) when utilised with cyanate salts or free isocyanic acid is particularly effective at effecting wash-durable flame retardance to textile materials and in particular cellulosic materials.

According to a fourth aspect, the present invention provides the use of a composition of the first aspect to impart flame retardancy to a material.

According to a fifth aspect of the invention there is provided a flame-retardant material treated with a composition as claimed in any of claims 1 to 6.

The invention will now be illustrated with reference to the following non-limiting examples.

EXAMPLES

Example A

A composition of the first aspect of the invention is detailed in the table A and was prepared by the method described.

TABLE A

| Chemical | Amount g/Kg | Chemical | Amount g/L |
|---|---|---|---|
| Phosphorous Acid | 127.75 | Phosphorous Acid | 160.6 |
| Potassium cyanate | 260.12 | Potassium cyanate | 327 |
| Ammonium hydroxide soln (35%) | 198.87 | Ammonium hydroxide soln (35%) | 250 |
| Ethylene Glycol | 15.91 | Ethylene Glycol | 20 |
| Listril NGS | 0.40 | Listril NGS | 0.5 |
| Water | 396.95 | Water | 499 |
| Total = | 1000 g | Total = | 1257.1 g |

Dissolve Phosphorous Acid (160.6 g) in water (80 ml) and then add ammonium hydroxide (240 ml) to adjust pH to pH 6.1

Dissolve potassium cyanate (327 g) in water (419 ml) pH = 10.6

Pour potassium cyanate solution into phosphorous acid solution

Leave the mixed solutions at room temperature for 4 days.

Add Listril NGS (0.5 g) and ethylene glycol (20 g).

Adjust the pH to desired value using formic acid.

Pad onto cotton fabric at ~70% wpu.

Dry at 120° C. for 30 Seconds

Bake at 200° C. for 90 seconds

Rinse fabric with cold running water

After-treatment with formic acid

After-treatment with specified Quat

Example B

A solution of ammonium phosphite ($HPO_3.2NH_4$) (160 g/l) and potassium cyanate (KOCN) (327 g/l), with a non-ionic ethoxylate surfactant such as Listril NGS (Stephenson Group, Bradford, UK) was padded onto cotton at a wet pick-up of 70% giving 5.35% phosphorous on mass of fibre (omf). The fabric was then dried in an oven at 120° C. for 30 seconds, and then cured at 200° C. for various times as shown in the table below. After processing, the fabric was subjected to various after-treatments including water rinsing, acid rinsing (sulphuric acid 10 g/l), and treatment with a quaternary ammonium compound ('Quat') such as Isol Fixer NFO (Ionic solutions Ltd, Bradford, UK).

After processing, the fabric was subjected to an alkaline wash fastness test (5 g/l sodium carbonate, 1 g/l Listril NGS) with a liquor ratio of 20:1 at 60° C. for 30 minutes.

The fabric was then flame tested in accordance with the method set out in BS5438 (Methods of test for flammability of textile fabrics when subjected to a small igniting flame applied to the face or bottom edge of vertically orientated specimens), where the fabric is supported in a vertical frame with a butane flame of specified length applied perpendicular to the fabric for 15 seconds.

The British standard requires a fabric to meet certain criteria in order to pass the standard. The most important of these is that the length of the observed char must not exceed the size of the test frame (approximately 15 cm). Afterglow, supporting a flame front and a hole in the charred region of the fabric are factors which determine the result of the test.

The results are given in Table B below:

TABLE B

Results of flame tests on treated cotton

| Drying | | Curing | | After- | Wash Fastness Tests | | |
| --- | --- | --- | --- | --- | --- | --- | --- |
| Temp | Time | Temp | Time | treatment | 0WFT | 1WFT | 3WFT |
| 120° C. | 30 secs | 200° C. | 60 secs | Water Rinse Acid Rinse | 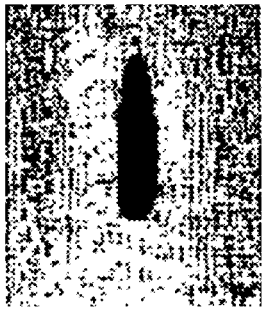 Pass | 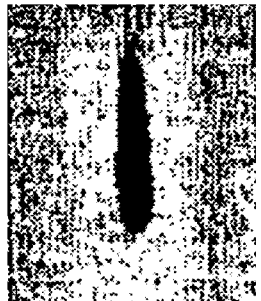 Pass | 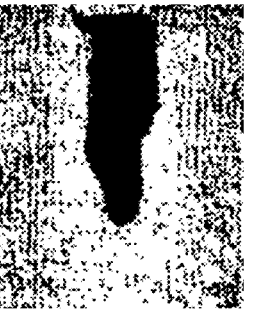 Fail |
| 120° C. | 30 secs | 200° C. | 60 secs | Water Rinse Acid Rinse Quat Rinse | 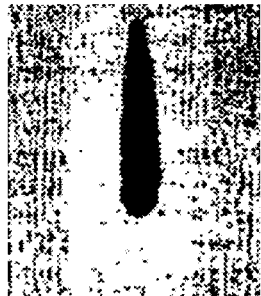 Pass | 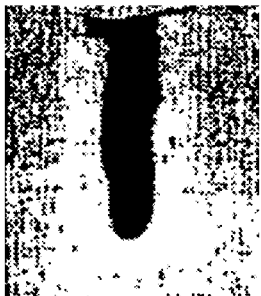 Fail |  Fail |
| 120° C. | 30 secs | 200° C. | 90 secs | Water Rinse Acid Rinse | 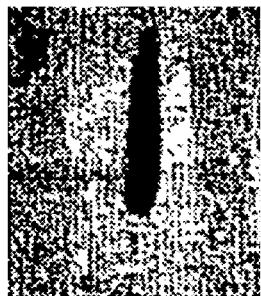 Pass | 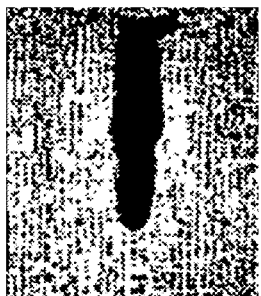 Fail | 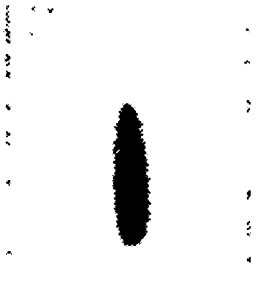 Pass |
| 120° C. | 30 secs | 200° C. | 90 secs | Water Rinse Acid Rinse Quat Rinse | 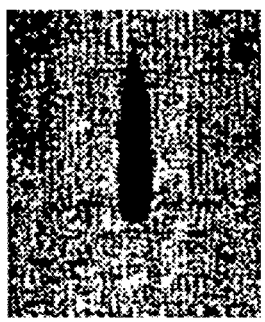 Pass | 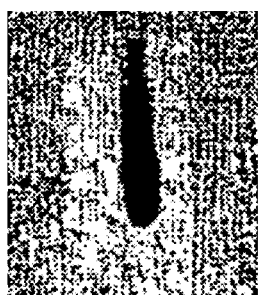 Pass | 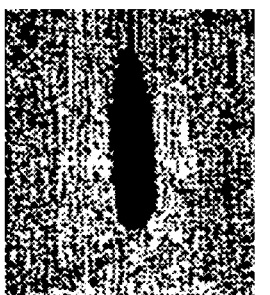 Pass |

TABLE B-continued

Results of flame tests on treated cotton

| Drying | | Curing | | After- | Wash Fastness Tests | | |
| --- | --- | --- | --- | --- | --- | --- | --- |
| Temp | Time | Temp | Time | treatment | 0WFT | 1WFT | 3WFT |
| 120° C. | 30 secs | 200° C. | 120 secs | Water Rinse Acid Rinse | 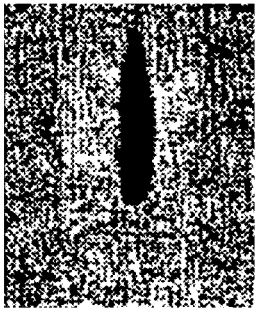 Pass | 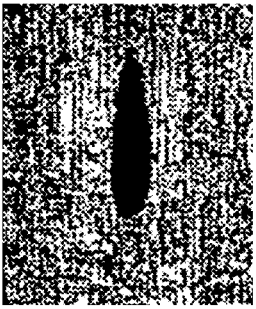 Pass | 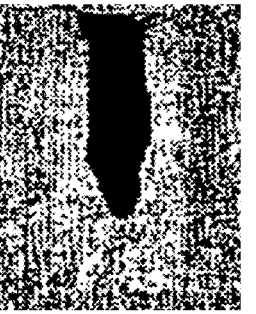 Fail |
| 120° C. | 30 secs | 200° C. | 120 secs | Water Rinse Acid Rinse Quat Rinse | 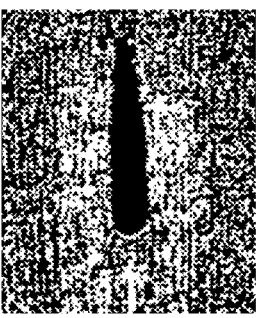 Pass | 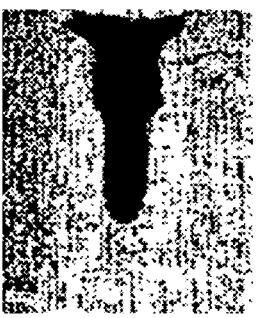 Fail | 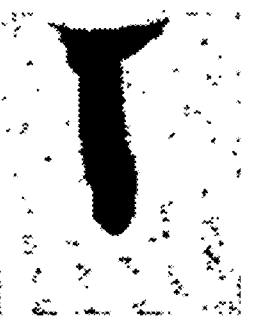 Fail |
| 120° C. | 30 secs | 200° C. | 150 secs | Water Rinse Acid Rinse | 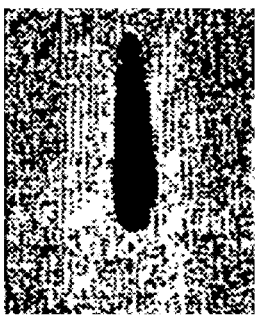 Pass | 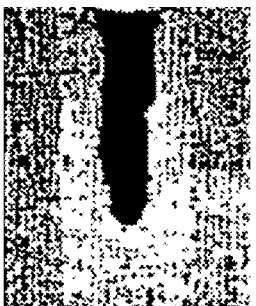 Fail | 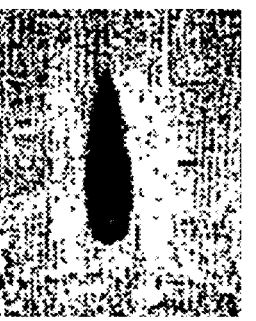 Pass |
| 120° C. | 30 secs | 200° C. | 150 secs | Water Rinse Acid Rinse Quat Rinse | 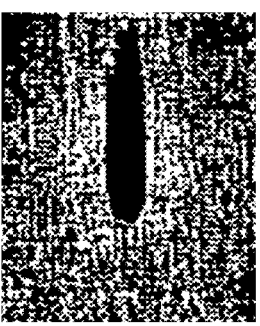 Pass | 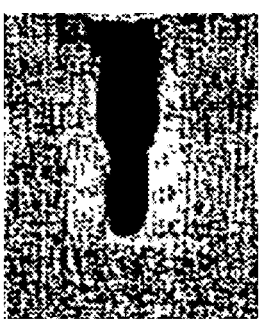 Fail | 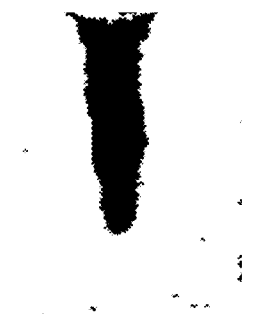 Fail |

Example C

A solution of ammonium phosphite ($HPO_3 \cdot 2NH_4$) (160 g/l), potassium cyanate (KOCN) (327 g/l), and ethylene glycol (20 g/l) with a non-ionic ethoxylate surfactant such as Listril NGS (Stephenson Group, Bradford, UK) was padded onto cotton at a wet pick-up of 70% giving 5.35% phosphorous on mass of fibre (omf). The fabric was then dried in an oven at 120° C. for 30 seconds, and then cured at 200° C. for various times as shown in the table below. After processing, the fabric was subjected to various after-treatments including water rinsing, acid rinsing (sulphuric acid 10 g/l), and treatment with a quaternary ammonium compound ('Quat') such as Isol Fixer NFO (Ionic solutions Ltd, Bradford, UK).

After processing, the fabric was subjected to an alkaline wash fastness test (5 g/l sodium carbonate, 1 g/l Listril NGS) with a liquor ratio of 20:1 at 60° C. for 30 minutes.

The fabric was then flame tested in accordance with the method set out in BS5438 (Methods of test for flammability of textile fabrics when subjected to a small igniting flame applied to the face or bottom edge of vertically orientated specimens), where the fabric is supported in a vertical frame with a butane flame of specified length applied perpendicular to the fabric for 15 seconds.

The British standard requires a fabric to meet certain criteria in order to pass the standard. The most important of these is that the length of the observed char must not exceed the size of the test frame (approximately 15 cm). Afterglow, supporting a flame front and a hole in the charred region of the fabric are factors which determine the result of the test.

The results are given in Table C below:

TABLE C

Results of flame tests on treated cotton

| Drying | | Curing | | After- | Wash Fastness Tests | | |
|---|---|---|---|---|---|---|---|
| Temp | Time | Temp | Time | treatment | 0WFT | 1WFT | 3WFT |
| 120° C. | 30 secs | 200° C. | 60 secs | Water Rinse Acid Rinse | 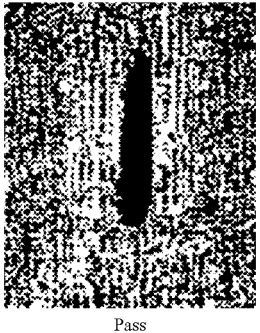 Pass | 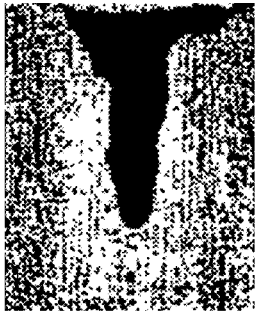 Fail |  Fail |
| 120° C. | 30 secs | 200° C. | 90 secs | Water Rinse Acid Rinse | 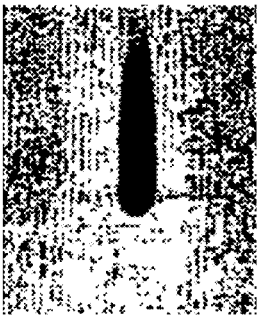 Pass | 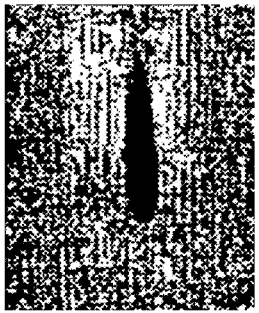 Pass | 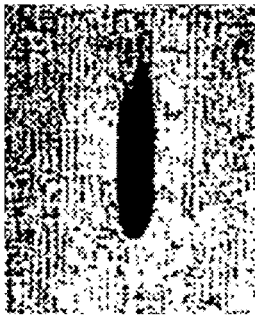 Pass |
| 120° C. | 30 secs | 200° C. | 90 secs | Water Rinse Acid Rinse Quat Rinse | 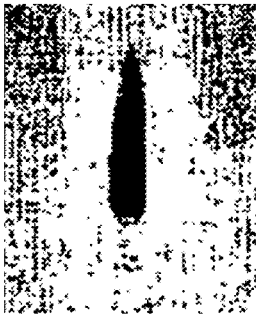 Pass | 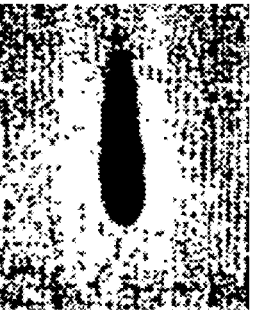 Pass | 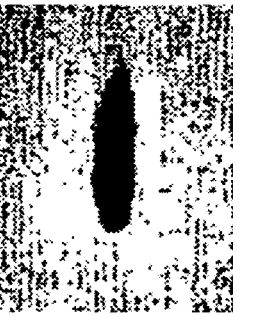 Pass |

TABLE C-continued

Results of flame tests on treated cotton

| Drying | | Curing | | After- | Wash Fastness Tests | | |
| Temp | Time | Temp | Time | treatment | 0WFT | 1WFT | 3WFT |
| --- | --- | --- | --- | --- | --- | --- | --- |
| 120° C. | 30 secs | 200° C. | 120 secs | Water Rinse Acid Rinse | 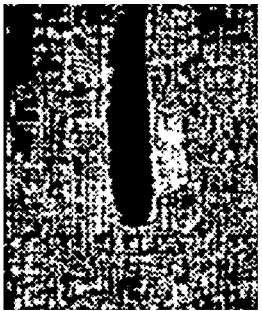 Pass | 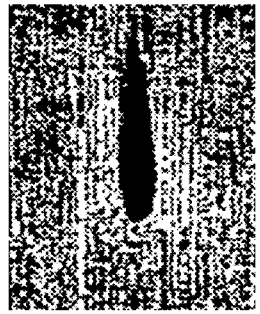 Pass | 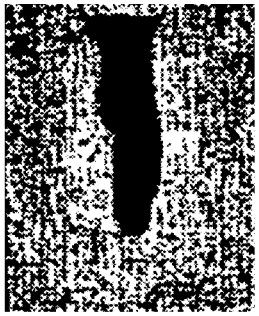 Fail |
| 120° C. | 30 secs | 200° C. | 120 secs | Water Rinse Acid Rinse Quat Rinse | 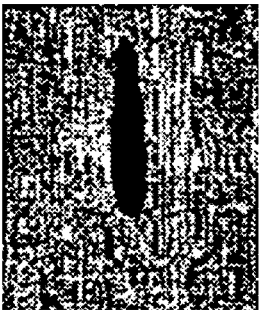 Pass |  Fail |  Fail |
| 120° C. | 30 secs | 200° C. | 150 secs | Water Rinse Acid Rinse |  Pass | 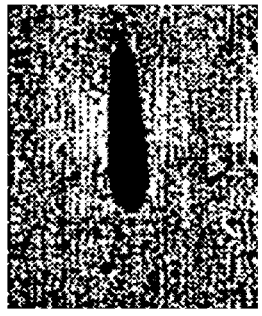 Pass | 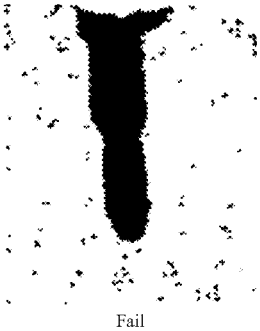 Fail |
| 120° C. | 30 secs | 200° C. | 150 secs | Water Rinse Acid Rinse Quat Rinse | 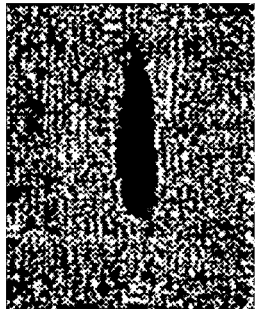 Pass | 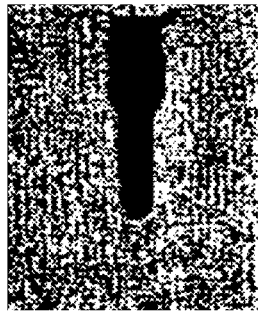 Fail |  Fail |

Example D

A solution of ammonium phosphite ($HPO_3 \cdot 2NH_4$) (160 g/l), potassium cyanate (KOCN) (327 g/l), and ethylene glycol (20 g/l) with a non-ionic ethoxylate surfactant such as Listril NGS (Stephenson Group, Bradford, UK) was adjusted to various pH values before being padded onto cotton at a wet pick-up of 70% giving 5.35% phosphorous on mass of fibre (omf). The fabric was then dried in an oven at 120° C. for 30 seconds, and then cured at 200° C. for 90 seconds as shown in the table below. After processing, the fabric was subjected to various after-treatments including water rinsing, acid rinsing (sulphuric acid 10 g/l), and treatment with a quaternary ammonium compound ('Quat') such as Isol Fixer NFO (Ionic solutions Ltd, Bradford, UK).

After processing, the fabric was subjected to an alkaline wash fastness test (5 g/l sodium carbonate, 1 g/l Listril NGS) with a liquor ratio of 20:1 at 60° C. for 30 minutes.

The fabric was then flame tested in accordance with the method set out in BS5438 (Methods of test for flammability of textile fabrics when subjected to a small igniting flame applied to the face or bottom edge of vertically orientated specimens), where the fabric is supported in a vertical frame with a butane flame of specified length applied perpendicular to the fabric for 15 seconds.

The British standard requires a fabric to meet certain criteria in order to pass the standard. The most important of these is that the length of the observed char must not exceed the size of the test frame (approximately 15 cm). Afterglow, supporting a flame front and a hole in the charred region of the fabric are factors which determine the result of the test.

The results are given in Table D below:

TABLE D

| pH of Pad Liquor | Drying | | Curing | | After-treatment | Wash Fastness Tests | |
|---|---|---|---|---|---|---|---|
| | Temp | Time | Temp | Time | | 0WFT | 3WFT |
| pH9 | 120° C. | 30 secs | 200° C. | 90 secs | Water Rinse Acid Rinse | Pass 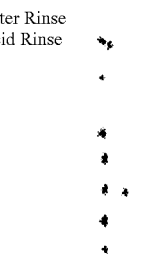 | Fail  |
| | 120° C. | 30 secs | 200° C. | 90 secs | Water Rinse Acid Rinse Quat Rinse | Pass  | Fail  |
| pH8 | 120° C. | 30 secs | 200° C. | 90 secs | Water Rinse Acid Rinse | Pass 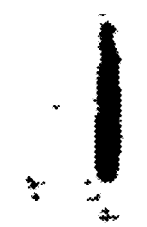 | Fail 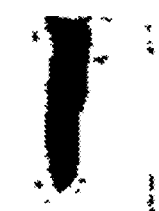 |
| | 120° C. | 30 secs | 200° C. | 90 secs | Water Rinse Acid Rinse Quat Rinse | Pass  | Fail  |

TABLE D-continued

Results of flame tests on treated cotton

| pH of Pad Liquor | Drying Temp | Time | Curing Temp | Time | After-treatment | Wash Fastness Tests 0WFT | 3WFT |
|---|---|---|---|---|---|---|---|
| pH7 | 120° C. | 30 secs | 200° C. | 90 secs | Water Rinse<br>Acid Rinse | Pass | Fail |
|  | 120° C. | 30 secs | 200° C. | 90 secs | Water Rinse<br>Acid Rinse<br>Quat Rinse | Pass | Fail |
| pH6 | 120° C. | 30 secs | 200° C. | 90 secs | Water Rinse<br>Acid Rinse | Pass | Fail |
|  | 120° C. | 30 secs | 200° C. | 90 secs | Water Rinse<br>Acid Rinse<br>Quat Rinse | Pass | Fail |

Example E

A solution of ammonium polyphosphate $(NH_4PO_3)_n$ (500 g/l) and potassium cyanate (KOCN) (327 g/l) with a non-ionic ethoxylate surfactant such as Listril NGS (Stephenson Group, Bradford, UK) was adjusted to various pH values before being padded onto cotton at a wet pick-up of 72% giving 4.32% phosphorous on mass of fibre (omf). The fabric was then dried in an oven at 120° C. for 30 seconds, and then cured at 200° C. for 70 seconds as shown in the table below. After processing, the fabric was subjected to various after-treatments including water rinsing, acid rinsing (sulphuric acid 10 g/l), and treatment with a quaternary ammonium compound ('Quat') such as Isol Fixer NFO (Ionic solutions Ltd, Bradford, UK).

After processing, the fabric was subjected to an alkaline wash fastness test (5 g/l sodium carbonate, 1 g/l Listril NGS) with a liquor ratio of 20:1 at 60° C. for 30 minutes.

The fabric was then flame tested in accordance with the method set out in BS5438 (Methods of test for flammability of textile fabrics when subjected to a small igniting flame applied to the face or bottom edge of vertically orientated specimens), where the fabric is supported in a vertical frame with a butane flame of specified length applied perpendicular to the fabric for 15 seconds.

The British standard requires a fabric to meet certain criteria in order to pass the standard. The most important of these is that the length of the observed char must not exceed the size of the test frame (approximately 15 cm). Afterglow, supporting a flame front and a hole in the charred region of the fabric are factors which determine the result of the test.

The results are given in Table E below:

TABLE E

Results of flame tests on treated cotton

| Drying | | Curing | | After- | Wash Fastness Tests | |
|---|---|---|---|---|---|---|
| Temp | Time | Temp | Time | treatment | 0WFT | 1WFT |
| 120° C. | 30 secs | 200° C. | 70 secs | Water Rinse Acid Rinse Quat Rinse | 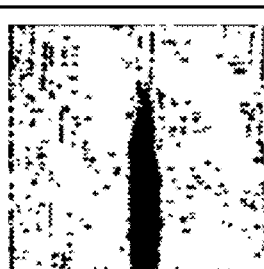 Pass | Fail |

Example F

A solution of ammonium phosphite ($HPO_3.2NH_4$) (160 g/l), potassium cyanate (KOCN) (327 g/l) was prepared and allowed to stand for 4 days. Ethylene glycol (20 g/l) with a non-ionic ethoxylate surfactant such as Listril NGS (Stephenson Group, Bradford, UK) was then added, and the mixture was padded onto cotton at pH9 with a wet pick-up of 70% giving 5.35% phosphorous on mass of fibre (omf). The fabric was dried in an oven at 120° C. for 30 seconds, and then cured at 200° C. for 90 seconds as shown in the table below. After processing, the fabric was subjected to a water rinse followed by an acid rinse (sulphuric acid 10 g/l).

After processing, the fabric was subjected to an alkaline wash fastness test (5 g/l sodium carbonate, 1 g/l Listril NGS) with a liquor ratio of 20:1 at 60° C. for 30 minutes.

The fabric was then flame tested in accordance with the method set out in BS5438 (Methods of test for flammability of textile fabrics when subjected to a small igniting flame applied to the face or bottom edge of vertically orientated specimens), where the fabric is supported in a vertical frame with a butane flame of specified length applied perpendicular to the fabric for 15 seconds.

The British standard requires a fabric to meet certain criteria in order to pass the standard. The most important of these is that the length of the observed char must not exceed the size of the test frame (approximately 15 cm). Afterglow, supporting a flame front and a hole in the charred region of the fabric are factors which determine the result of the test.

The results are given in Table F below:

TABLE F

Results of flame tests on treated cotton

| Drying | | Curing | | After- | Wash Fastness Tests | |
|---|---|---|---|---|---|---|
| Temp | Time | Temp | Time | treatment | 0WFT | 12WFT |
| 120° C. | 30 secs | 200° C. | 60 secs | Water Rinse Acid Rinse | 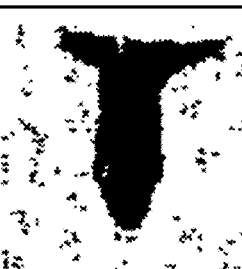 Pass | Pass |

Example G

A solution of ammonium phosphite ($HPO_3 \cdot 2NH_4$) (160 g/l), potassium cyanate (KOCN) (327 g/l), and ethylene glycol (20 g/l) with a non-ionic ethoxylate surfactant such as Listril NGS (Stephenson Group, Bradford, UK) was adjusted pH9 before being padded onto cotton at various wet pick ups—to give varying percentage of phosphorous on mass of fibre (omf). The fabric was then dried in an oven at 120° C. for 30 seconds, and then cured at 200° C. for 90 seconds as shown in the table below. After processing, the fabric was subjected to various after-treatments including water rinsing, acid rinsing (sulphuric acid 10 g/l), and treatment with a quaternary ammonium compound ('Quat') such as Isol Fixer NFO (Ionic solutions Ltd, Bradford, UK).

After processing, the fabric was subjected to an alkaline wash fastness test (5 g/l sodium carbonate, 1 g/l Listril NGS) with a liquor ratio of 20:1 at 60° C. for 30 minutes.

The fabric was then flame tested in accordance with the method set out in BS5438 (Methods of test for flammability of textile fabrics when subjected to a small igniting flame applied to the face or bottom edge of vertically orientated specimens), where the fabric is supported in a vertical frame with a butane flame of specified length applied perpendicular to the fabric for 15 seconds.

The British standard requires a fabric to meet certain criteria in order to pass the standard. The most important of these is that the length of the observed char must not exceed the size of the test frame (approximately 15 cm). Afterglow, supporting a flame front and a hole in the charred region of the fabric are factors which determine the result of the test.

The results are given in Table G below:

TABLE G

| | | | | | | | |
|---|---|---|---|---|---|---|---|
| | | | Results of flame tests on treated cotton | | | | |
| | Drying | | Curing | | After- | | |
| % P omf | Temp | Time | Temp | Time | treatment | Flame Test | Result |
| 3.29% | 120° C. | 30 secs | 200° C. | 120 secs | Water Rinse Acid Rinse Quat Rinse |  | Pass |
| 3.02% | 50° C. | 84 secs | 200° C. | 70 secs | Water Rinse Acid Rinse |  | Pass |

Example H

A solution of phosphorous acid ($H_3PO_3$) (159 g/l) was padded onto cotton at a wet pick-up of 100% giving 6% phosphorous on mass of fibre (omf). The fabric was then dried in an oven at 100° C. for 2 minutes. A solution of potassium cyanate (272 g/l, 3.36 mol) was then padded onto the phosphorous pre-treated cotton and then cured at varying temperatures and duration as shown in the table below. After processing, the fabric was subjected to an alkaline boil (5 g/l sodium carbonate, 5 g/l Sandozin NIE) (Sandozin NIE is a non-ionic ethoxylate surfactant supplied by Clariant) for 20 minutes.

The flame test is conducted by supporting the cotton fabric in a vertical frame with a butane flame applied perpendicular to the fabric at a distance of approximately 10 cm for 10 seconds.

The results are given in Table H below:

TABLE H

Results of flame tests on treated cotton

| P from $H_3PO_3$ | KOCN | Drying Temp | Time | Curing Temp | Time | FR | Description of char | Durable |
|---|---|---|---|---|---|---|---|---|
| 6% omf | 3.3 mol | 100° C. | 2 min | 200° C. | 30 sec | Yes | Char over 80% | 2x Alkaline 20' boil washes |
| 6% omf | 3.3 mol | 100° C. | 2 min | 200° C. | 60 sec | Yes | Tailed Spot Char | 2x Alkaline 20' boil washes |
| 6% omf | 3.3 mol | 100° C. | 2 min | 200° C. | 90 sec | Yes | Spot Char | 2x Alkaline 20' boil washes |
| 6% omf | 3.3 mol | 100° C. | 2 min | 190° C. | 30 sec | Yes | Char ~80% area | 2x Alkaline 20' boil washes |
| 6% omf | 3.3 mol | 100° C. | 2 min | 190° C. | 60 sec | Yes | Char ~70% area | 2x Alkaline 20' boil washes |
| 6% omf | 3.3 mol | 100° C. | 2 min | 190° C. | 90 sec | Yes | Char ~50% area | 2x Alkaline 20' boil washes |
| 6% omf | 3.3 mol | 100° C. | 2 min | 180° C. | 30 sec | Yes | Char ~90% area | 2x Alkaline 20' boil washes |
| 6% omf | 3.3 mol | 100° C. | 2 min | 180° C. | 60 sec | Yes | Char ~70% area | 2x Alkaline 20' boil washes |
| 6% omf | 3.3 mol | 100° C. | 2 min | 180° C. | 90 sec | Yes | Char ~70% area | 2x Alkaline 20' boil washes |
| 6% omf | 3.3 mol | 100° C. | 2 min | 170° C. | 30 sec | Yes | Char ~90% area | 2x Alkaline 20' boil washes |
| 6% omf | 3.3 mol | 100° C. | 2 min | 170° C. | 60 sec | Yes | Char ~90% area | 2x Alkaline 20' boil washes |
| 6% omf | 3.3 mol | 100° C. | 2 min | 170° C. | 90 sec | Yes | Char ~90% area | 2x Alkaline 20' boil washes |

'Spot Char' indicates charring only in spot where flame was applied, whereas 'Tailed Spot Char' indicates that the char has enlarged in a tear-shape from the spot where it was introduced. 'Char ~X%' indicates that the char has grown from the point of origin and covers ~X% of the sample.

Example I

A solution of phosphorous acid ($H_3PO_3$) (159 g/l) was padded onto cotton at a wet pick-up of 100% giving 6% phosphorous omf. The fabric is then dried in an oven at 100° C. for 2 minutes. A solution of potassium cyanate (272 g/l, 3.36 mol) was then padded onto the phosphorous pre-treated cotton and then cured at varying temperatures and duration as shown in the table below. The process was repeated to so that the cotton had two consecutive treatments. After processing, the fabric was subjected to an alkaline boil (5 g/l sodium carbonate, 5 g/l Sandozin NIE) for 20 minutes. The cotton fabric was supported in a vertical frame with a butane flame applied perpendicular to the fabric at a distance of approximately 10 cm for 10 seconds.

The results are given in Table I below.

TABLE I

Flame test results on treated cotton

| P from $H_3PO_3$ | KOCN | Drying Temp | Time | Curing Temp | Time | FR | Description of char | Durable |
|---|---|---|---|---|---|---|---|---|
| 6% omf | 3.3 mol | 100° C. | 2 min | 120° C. | 30 sec | Yes | Char over 70% | 2x Alkaline 20' boil washes |
| 6% omf | 3.3 mol | 100° C. | 2 min | 130° C. | 60 sec | Yes | Char over 60% | 2x Alkaline 20' boil washes |
| 6% omf | 3.3 mol | 100° C. | 2 min | 140° C. | 90 sec | Yes | Char over 60% | 2x Alkaline 20' boil washes |
| 6% omf | 3.3 mol | 100° C. | 2 min | 160° C. | 90 sec | Yes | Char over 40% | 2x Alkaline 20' boil washes |

'Char ~X %' indicates that the char has grown from the point of origin and covers ~X % of the sample.

Example J

Various solutions of phosphorous acid ($H_3PO_3$) (159 g/l) were padded onto cotton at a wet pick-up of 100%. The fabric is then dried in an oven at 100° C. for 2 minutes. A solution of potassium cyanate (272 g/1, 3.36 mol) was then padded onto the phosphorous pre-treated cotton and then cured at varying temperatures and duration as shown in the table below. The process was repeated so that the cotton had two consecutive treatments. After processing, the fabric was subjected to an alkaline boil (5 g/l sodium carbonate, 5 g/l Sandozin NIE) for 20 minutes.

The cotton fabric was supported in a vertical frame with a butane flame applied perpendicular to the fabric at a distance of approximately 10 cm for 10 seconds.

The results are given in Table J below.

Example K

Various solutions of phosphorous acid ($H_3PO_3$) (159 g/l) were padded onto cotton at a wet pick-up of 100%. The fabric was then dried in an oven at 100° C. for 2 minutes. A solution of potassium cyanate (272 g/1, 3.36 mol) was then padded onto the phosphorous pre-treated cotton and then cured at varying temperatures and duration as shown in the table below. Parts of the process were repeated to so that the cotton had two consecutive treatments of specific stages—see table below. After processing, the fabric is subjected to an alkaline boil (5 g/l sodium carbonate, 5 g/l Sandozin NIE) for 20 minutes.

The cotton fabric was supported in a vertical frame with a butane flame applied perpendicular to the fabric at a distance of approximately 10 cm for 10 seconds.

The results are given in Table 4 below.

TABLE J

Flame test results on treated cotton

| P from $H_3PO_3$ | KOCN | Drying Temp | Time | Curing Temp | Time | FR | Description of char | Durable |
|---|---|---|---|---|---|---|---|---|
| 4% omf | 5 mol soln | 100° C. | 2 min | 135° C. | 5 min | Yes | Char ~30% | 2x Alkaline 20' boil washes |
| 8% omf | 5 mol soln | 100° C. | 2 min | 135° C. | 5 min | Yes | Spot Char | 2x Alkaline 20' boil washes |
| 12% omf | 5 mol soln | 100° C. | 2 min | 135° C. | 5 min | Yes | Spot Char | 2x Alkaline 20' boil washes |

TABLE K

| | | \multicolumn{2}{c}{Drying} | \multicolumn{2}{c}{Curing} | | Description | |
|---|---|---|---|---|---|---|---|---|
| P from $H_3PO_3$ | KOCN | Temp | Time | Temp | Time | FR | of char | Durable |
| 8% omf | 5 mol soln | 100° C. | 2 min | 135° C. | 5 min | Yes | Char over 40% | 2x Alkaline 20' boil washes |
| 12% omf | 5 mol soln | 100° C. | 2 min | 135° C. | 5 min | Yes | Tailed Spot Char | 2x Alkaline 20' boil washes |
| 12% omf | 5 mol soln - Double treatment | 100° C. | 2 min | 135° C. | 5 min | Yes | Spot Char | 2x Alkaline 20' boil washes |

Flame test results on treated cotton

The invention claimed is:

1. A wash durable flame-retardant composition comprising 5 to 20 wt % phosphorous acid, 1 to 40 wt % potassium cyanate, 1 to 30 wt % ammonium hydroxide, 0.1 to 5 wt % ethylene glycol, and water wherein the composition has a pH of between 8 and 11.

2. A flame-retardant material treated with a composition as claimed in claim 1.

3. A wash durable flame-retardant composition comprising 5 to 20 wt % phosphorous acid, 1 to 40 wt % potassium cyanate, 1 to 30 wt % ammonium hydroxide, 0.1 to 5 wt % ethylene glycol, and water.

4. A flame-retardant material treated with a composition as claimed in claim 3.

5. A method of providing a wash durable flame-retardant finish to a material, the method comprising:

a) applying to the material a composition comprising a first component selected from phosphorous acid or a salt of phosphorous acid; and b) applying to the material a composition comprising a second component of potassium cyanate; and c) curing the material; in which during step c) the pH of the composition to the material fall;

and wherein the composition comprising 5 to 20 wt % phosphorous acid, 1 to 40 wt % potassium cyanate, 1 to 30 wt % ammonium hydroxide, 0.1 to 5 wt % ethylene glycol, and water.

6. A method according to claim 5 in which steps a) and b) are carried out simultaneously.

7. A method according to claim 5 in which the curing is carried out a temperature of 150° C. to 220° C. for a period of 10 to 120 seconds.

* * * * *